(12) United States Patent
White et al.

(10) Patent No.: US 12,392,756 B2
(45) Date of Patent: Aug. 19, 2025

(54) ROLLER SEARCH UNIT HAVING INTEGRATED DIGITAL CIRCUITRY FOR DETECTING RAIL DEFECTS

(71) Applicant: Herzog Services, Inc., St. Joseph, MO (US)

(72) Inventors: Andy White, Savannah, MO (US); Troy L. Elbert, St. Joseph, MO (US); Brent T. Applebury, St. Joseph, MO (US); Timothy J. Coolman, Savannah, MO (US); Jason Roe, St. Joseph, MO (US)

(73) Assignee: Herzog Services, Inc., St. Joseph, MO (US)

( * ) Notice: Subject to any disclaimer, the term of this patent is extended or adjusted under 35 U.S.C. 154(b) by 324 days.

(21) Appl. No.: 18/158,769

(22) Filed: Jan. 24, 2023

(65) Prior Publication Data
US 2023/0236156 A1    Jul. 27, 2023

Related U.S. Application Data

(60) Provisional application No. 63/267,109, filed on Jan. 25, 2022.

(51) Int. Cl.
*G01N 29/44* (2006.01)
*G01N 29/04* (2006.01)
*G01N 29/265* (2006.01)

(52) U.S. Cl.
CPC ......... *G01N 29/4463* (2013.01); *G01N 29/04* (2013.01); *G01N 29/265* (2013.01);
(Continued)

(58) Field of Classification Search
CPC ..... G01N 2291/0289; G01N 2291/106; G01N 2291/2623; G01N 29/04; G01N 29/043;
(Continued)

(56) References Cited

U.S. PATENT DOCUMENTS 4,174,636 A * 11/1979 Pagano ................. G01N 29/043
73/639
4,235,112 A * 11/1980 Kaiser .................... G01N 29/26
73/636
(Continued)

FOREIGN PATENT DOCUMENTS

CN    202305483 U    7/2012
CN    207015352 U    2/2018
(Continued)

*Primary Examiner* — Andre J Allen
(74) *Attorney, Agent, or Firm* — AVEK IP, LLC; Mark C. Young; Kent R. Erickson (57) ABSTRACT

A roller search unit for detecting rail defects with integrated digital circuitry includes a liquid filled tire mounted to an axle assembly with wheels. An ultrasonic transducer array positioned within a housing is positioned within the within the tire and coupled to the axle. The housing contains transducer interface circuitry operable to receive analog signals from the ultrasonic transducer array and contains digital flaw detection circuitry operable to convert the analog signals to digital signals and perform analysis on the digital signals to detect flaws in a rail. The transducer interface circuitry and digital flaw detection circuitry are configured to stack to provide a compact, small footprint assembly. The conversion of the transducer signals from analog to digital within the tire permits transmission of the digitized data without susceptibility to interference and noise.

13 Claims, 5 Drawing Sheets

(52) U.S. Cl.
CPC ............. *G01N 2291/0289* (2013.01); *G01N 2291/2623* (2013.01)

(58) Field of Classification Search
CPC ............ G01N 29/225; G01N 29/2493; G01N 29/265; G01N 29/28; G01N 29/446
USPC .................................................. 73/146–146.8
See application file for complete search history.

(56) References Cited

U.S. PATENT DOCUMENTS

| | | | | |
|---|---|---|---|---|
| 6,055,862 | A * | 5/2000 | Martens | ................. G01N 29/28 73/635 |
| 6,951,132 | B2 | 10/2005 | Davenport et al. | |
| 7,849,748 | B2 * | 12/2010 | Havira | ................... G01N 29/28 73/639 |
| 8,424,387 | B2 * | 4/2013 | Wigh | .................. G01N 29/043 73/644 |
| 8,560,151 | B2 | 10/2013 | Armitage et al. | |
| 10,836,407 | B2 | 11/2020 | Veitch | |
| 10,989,694 | B2 | 4/2021 | Kawabata et al. | |
| 2009/0282923 | A1 | 11/2009 | Havira | |
| 2016/0221591 | A1 | 8/2016 | Kuehbandner et al. | |
| 2016/0304104 | A1 * | 10/2016 | Witte | ................... B61L 23/044 |
| 2019/0161095 | A1 * | 5/2019 | Veitch | ................. G01N 29/265 |
| 2019/0346408 | A1 | 11/2019 | Scalea | |
| 2020/0070862 | A1 * | 3/2020 | Bilodeau | ................. B61L 1/06 |
| 2020/0198672 | A1 * | 6/2020 | Underwood | ........... G01N 29/07 |
| 2020/0302200 | A1 | 9/2020 | Lisseman et al. | |
| 2021/0293758 | A1 * | 9/2021 | Kocur | ..................... B61K 9/10 |

FOREIGN PATENT DOCUMENTS

| | | | |
|---|---|---|---|
| CN | 209559821 U | 10/2019 | |
| CN | 209656630 U | 11/2019 | |
| CN | 209919895 U | 1/2020 | |
| CN | 110907363 A | 3/2020 | |
| EP | 1132735 A1 * | 9/2001 | ............... B61K 9/10 |
| WO | 2020058663 A1 | 3/2020 | |

* cited by examiner

ROLLER SEARCH UNIT HAVING INTEGRATED DIGITAL CIRCUITRY FOR DETECTING RAIL DEFECTS

CROSS-REFERENCE TO RELATED APPLICATIONS

This application claims the benefit of U.S. Provisional Patent Application No. 63/267,109, filed Jan. 25, 2022, the disclosure of which is hereby incorporated herein in its entirety by reference.

FIELD

The present invention generally relates to an apparatus for detecting defects in a railway rail, and more particularly, to a roller search unit (RSU) for detecting rail defects having compact integrated digital circuitry.

BACKGROUND

Under normal use conditions, the rail portions of railways and track structures will be subjected to severe environmental conditions as well as to stress from the weight and movement of railroad traffic. Over time, these conditions can result in the rail developing detrimental flaws, such as deformations, stress fractures, and the like. Left undetected and unrepaired, such defects can eventually worsen, leading to further damage or even catastrophic failure of the rail.

To detect such flaws and defects, ultrasonic testing of the rails has been employed. In a common method of ultrasonic testing, vehicles travel along the track and continuously apply ultrasonic signals to the rails, receive ultrasonic signals reflected back from the rails, and provide indications of flaws and defects based on the received signals.

Some known ultrasonic systems, such as that described in U.S. Pat. No. 8,424,387, employ small, thin-walled tires configured in a roller search unit (RSU) mounted on a test vehicle and in rolling contact with the running surface of the rails. The tires are pressed against the rail so as to have a flat area in contact with the rail, with ultrasonic transducers positioned within the typically liquid-filled tires and arranged at various angles to produce ultrasonic acoustic beams that are directed at angles toward the rail surface, with the ultrasonic signals reflected from the rails captured by the transducers and transmitted to external or remotely located flaw detection circuitry.

In such known ultrasonic flaw detection systems, the received signals from the transducers are most often transmitted as analog signals over a coaxial cable, or a group of coaxial cables, to a remotely located flaw detection and processing unit where the signal is further processed and analyzed to identify defects or flaws in the rail. However, the arrangement of the analog circuitry at the RSU and the transmission over analog coaxial cable to the remote flaw detection and processing unit exposes the transmitted analog data signal(s) to noise and other interference introduced along the transmission path, particularly the coaxial cable. For example, electrical noise from overhead power lines and radio frequency (RF) communications devices can often interfere with the analog signal to the point that testing can be rendered invalid due to the noise introduced, with the signal to noise ratio reduced to an unacceptable level.

Thus, it can be seen that there remains a need in the art for an improved system and method for ultrasonic inspection for detecting defects in a railway rail.

SUMMARY

The present invention is directed to a roller search unit (RSU) having integrated digital flaw detection digital circuitry for identifying flaws and defects in rails and transmitting digital information to a remote computer or control center.

In one aspect, the roller search unit (RSU) comprises one or more ultrasonic transducers, such as a transducer array, and digital flaw detection circuitry integrated into a compact housing for attachment to a wheel hub or axle which is further placed into a tire which travels along a rail surface in the same manner as conventional known RSU units. With the digital flaw detection circuitry coupled to an array of ultrasonic transducers and positioned within close proximity to the transducers, the signal path between the transducers and the digital flaw detection circuitry is minimized, thus reducing the susceptibility of the signal path to electrical noise, and increasing the signal to noise ratio of the signal as compared to conventional RSU configurations transmitting the analog signals from the transducers over a relatively lengthy coaxial cable.

In another aspect, the digital flaw detection circuitry comprises analog-to-digital converter (ADC) circuitry operable to convert the analog signals from the ultrasonic transducers to digital signals, and further comprises digital signal processing (DSP) circuitry in the form of one or more processors, floating point gate arrays (FPGAs), memory, or other such circuitry, operable to perform analysis on the converted digital circuitry and to identify flaws or defects in the rail under examination.

In a further aspect, the digital flaw detection circuitry, power supply circuitry, and transducer interface circuitry is assembled onto a plurality of circuit boards connected by a configuration of header connectors and mating socket connectors on the boards to allow the boards to be arranged in a stacked configuration to achieve a small overall footprint for placement into a housing configured to be placed within the liquid filled tire, with an ultrasonic transducer array positioned over the housing to enclose the circuitry within. Thus, the entire ultrasonic transducer array, transducer interface circuitry, power supply circuitry, and digital flaw detection circuitry is configured within a compact housing for placement within a tire and/or attachment to a wheel hub or axle.

In a further aspect, communication circuitry and/or power supply circuitry is configured to attach to the wheel hub or axle to provide power to the RSU unit and to allow the RSU to communicate to a remote computer or control center, preferably over a digital communications path such as an Ethernet cable, wireless transmission, or other communications method and standard known in the art.

Other configurations and embodiments of the RSU as described herein will be apparent to those skilled in the art and are within the scope of the present invention.

DESCRIPTION OF THE DRAWINGS

Illustrative embodiments of the invention are described in detail below with reference to the attached drawing figures, and wherein.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

Figure 1:
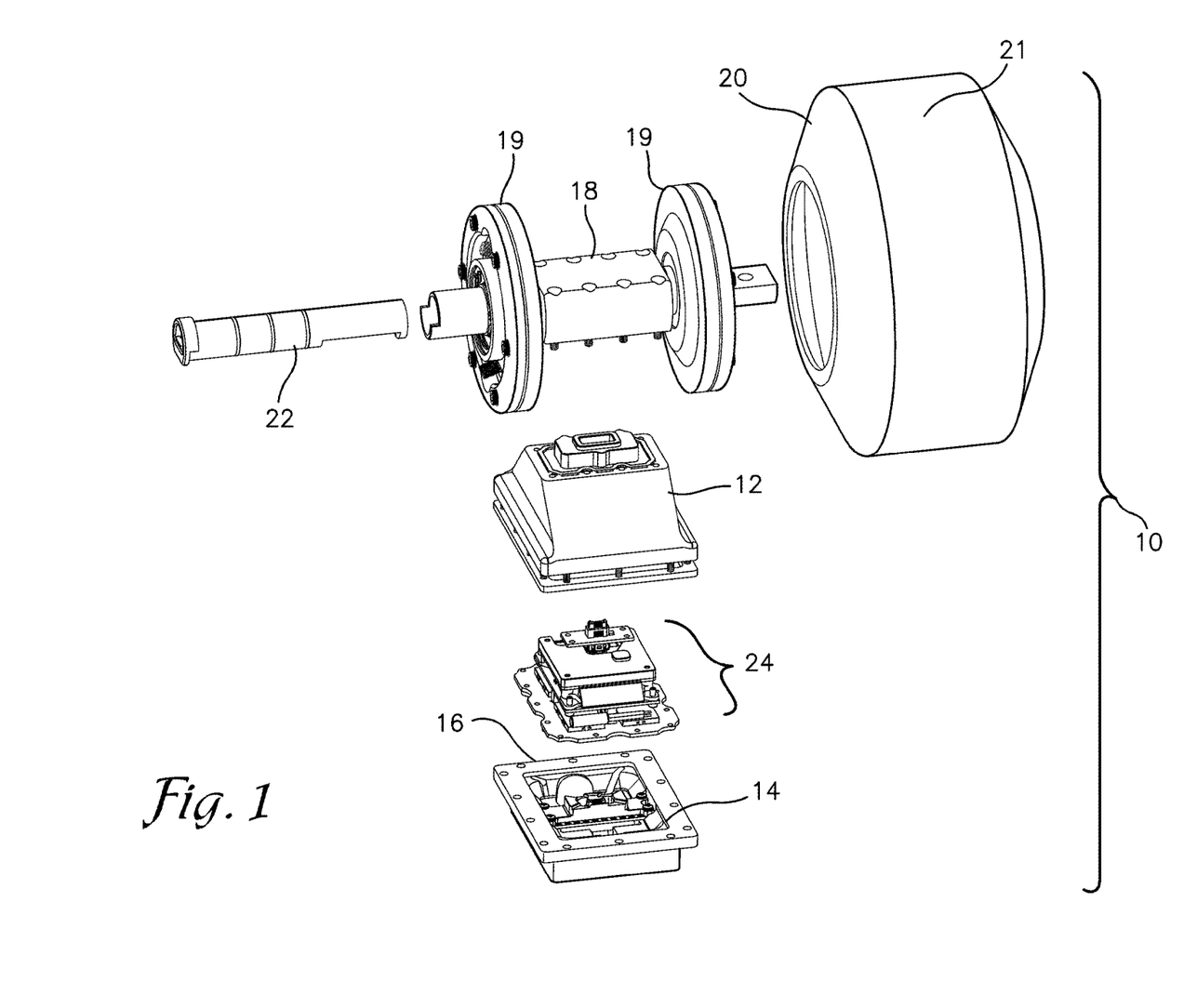
FIG. 1 is an exploded view of a roller search unit (RSU) for detecting rail defects with integrated digital circuitry in accordance with an exemplary embodiment of the present invention.

Looking first to FIG. 1, an exploded view of a roller search unit (RSU) assembly for detecting rail defects with integrated digital circuitry is generally indicated by reference numeral 10. The RSU assembly 10 includes a tire 20 mounted to two wheels 19 which are rotatably attached to an axle body 18 such that, in use, the tire 20 and wheels 19 rotate about the axle body 18. Thus, with the axle body 18 attached to a transport vehicle, the circumferential contact surface or tread 19 of the tire makes contact with a running surface of a rail undergoing inspection by the RSU. In some embodiments, the tire 20 may be filled with a coupling liquid such as a water/ethylene glycol mixture to facilitate transmission of ultrasonic waves from one or more ultrasonic transducers positioned within the tire as will now be described.

A flaw detection housing 12 is configured to enclose and contain flaw detection circuitry, comprising: a plurality of printed circuit boards arranged in a compact stacked configuration 24, wiring, and circuitry; an ultrasonic transducer array 14 for generating ultrasonic signals which are directed towards a rail and for receiving ultrasonic signals reflected back from the rail; and a probe interface board 16 configured to connect the ultrasonic transducer array 14 to the flaw detection circuitry within the flaw detection housing 12.

The flaw detection circuitry contained in the stacked arrangement of circuit boards 24 contained within the flaw detection housing 12 preferably includes power supply circuitry, transducer interface circuitry, digital flaw detection circuitry and their respective circuit boards, along with associated interconnection wiring.

With the flaw detection circuitry and circuit boards positioned within the flaw detection housing 12, the probe interface board 16 facilitates communication between the ultrasonic transducer array 14 and the flaw detection circuitry, with the ultrasonic transducer array and housing 14 further serving to cover the open side of the flaw detection housing 12 and to enclose the circuitry and circuit boards within.

Looking still to FIG. 1, with the circuitry and circuit boards enclosed within the flaw detection housing 12 and the housing 12 covered by and attached to the ultrasonic transducer array 14, the flaw detection housing 12 attaches to the axle body 18, between the wheels 19, such that the entire flaw detection housing 12 (with attached ultrasonic transducer array and housing 14) and axle body 18 may be inserted completely into the tire 20. An axle printed circuit board (PCB) 22 inserts into the open outer end of the axle body 18 to provide power and a communications interface to the circuitry contained within the flaw detection housing 12 so that digital data from the flaw detection circuitry may be transmitted to an external computer or storage device.

With the RSU assembly assembled as just described, the assembly may be attached to a vehicle operable to transport the RSU assembly along a section of rail to be inspected, with the surface 21 of the liquid-filled tire 20 pressed against the surface of the rail undergoing inspection so as to have a flat area in contact with the rail as the RSU is transported along the rail in a manner as described, for example in U.S. Pat. No. 8,424,387.

However, unlike the systems of the prior art the RSU assembly 10 of the present invention incorporates digital flaw detection circuitry within the flaw detection housing 12, in close proximity to the ultrasonic transducer array 14 so that signals from the ultrasonic transducer travel a short distance, directly to the digital flaw detection circuitry, without a lengthy run of coaxial cables transmitting analog signals from the ultrasonic transducer array to external processing circuitry as is typical in prior art systems, increasing the susceptibility of the analog signals to interference and noise. Thus, the signals received from the ultrasonic transducer array 14 are immediately and directly converted to digital signals by the flaw detection circuitry located within the wheel 20 itself, minimizing the susceptibility to externally induced interference and noise.

Figure 2:
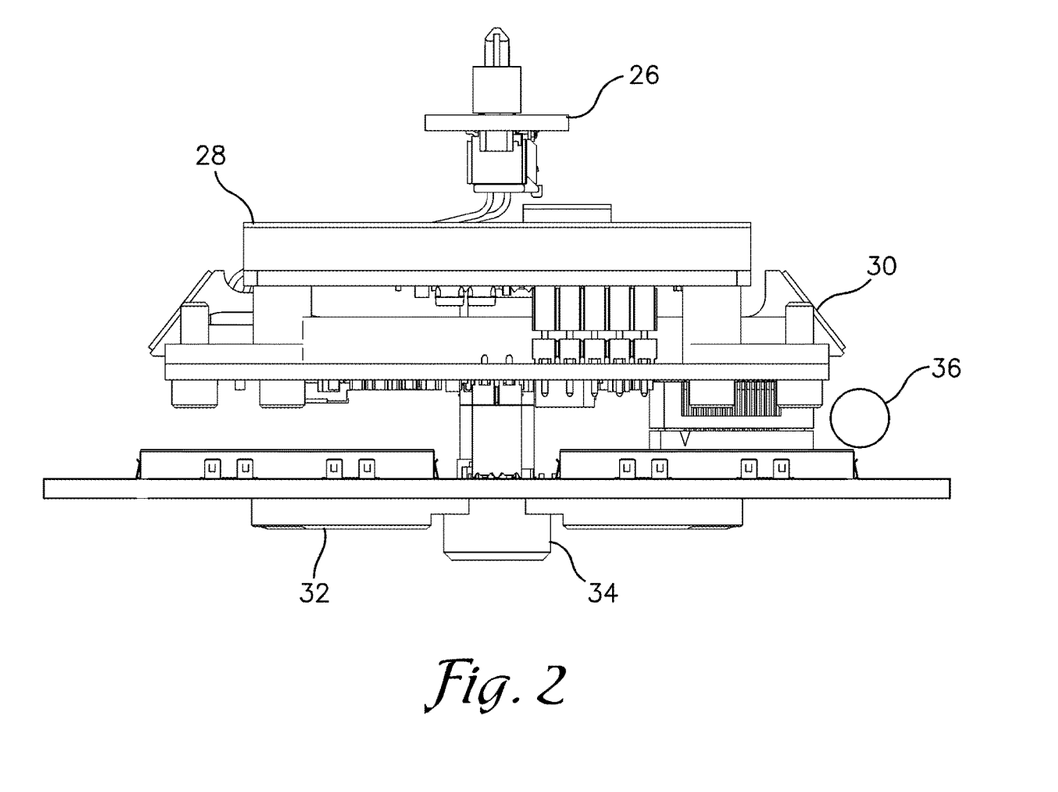
FIG. 2 is a side view of a stacked arrangement of circuit boards within the RSU of FIG. 1 in accordance with an exemplary embodiment of the present invention.

Turning to FIG. 2, a side view of the circuit board stack 24 comprising the flaw detection circuitry is depicted. The stacked circuit boards include: an axle interface circuit board 26, a power supply circuit board 28, an input/output (I/O) communication board 30, a pulser/receiver board 32, and a probe interface connector 34. In some embodiments, a heating element 36 is included to provide heat to the enclosed flaw detection circuitry. In other embodiments, a cooling element or fan may be included to cool the enclosed flaw detection circuitry.

Looking still to FIG. 2, the power supply circuit board 28 provides power to the remainder of the flaw detection circuitry, namely the axle interface board 26, the I/O communication board 30, the pulser/receiver board 32, the probe interface connector 34 (which in turn provides power to the ultrasonic transducer array), and to the heating element 36 (or, in some embodiments, a cooling element or fan).

Input power to the power supply circuit board 28 is propagated to the board through the axle printed board 22 as seen in FIG. 1 and further through the axle interface board 26 located at the top of the stack of circuit boards. The power supply circuit board 28 preferably receives a voltage input and converts it to one or more voltages to be used by the circuitry on the other circuit boards using any power conversion circuitry known in the art, such as voltage regulators and the like.

Preferably, power circuit board 24 receives 12 volts DC from an external supply and converts that DC voltage to one or more desired DC voltage levels as required by the flaw detection circuitry. For example, the 12 VDC may be converted to 3.5 VDC, 5 VDC, or any other voltage level as necessary.

It should be understood that power received by those other circuit boards may be further transmitted to additional circuitry or circuit boards as necessary. For example, the pulser receiver board 28 may transmit power to the probe interface board 16. It should be further understood that while power distribution may be depicted in a particular manner in these exemplary embodiments—e.g., via a header connector or ribbon cable—that power may be distributed in other ways to the various circuitry without deviating from the present invention. Likewise, while specific connectors may be depicted in the exemplary embodiments—e.g., a header connector between the pulser receiver board 28 and the I/O communication board 25—that other connectors or wiring may be used, for example a ribbon cable.

Figure 3:
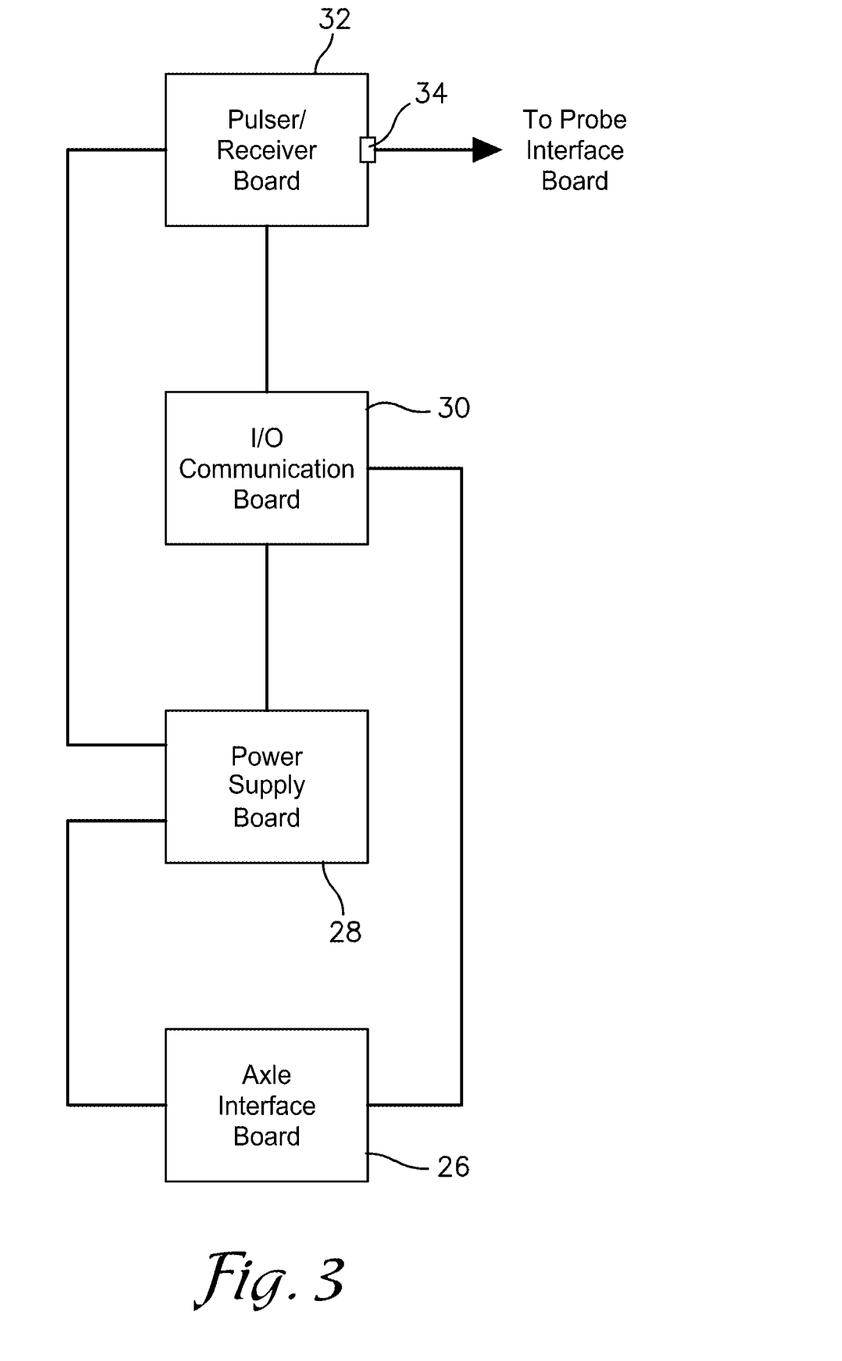
FIG. 3 is a block diagram of a pulser/receiver circuit board, and input/output (IO) communication circuit board, a power supply circuit board, and an axle interface board of the RSU of FIG. 1 in accordance with an exemplary embodiment of the present invention.

Looking to the block diagram of FIG. 3 in conjunction with FIG. 2, the functionality of the boards will now be described with reference to those two figures.

Pulser receiver board 32 includes circuitry operable to communicate with one or more ultrasonic transducer arrays, such as the ultrasonic transducer array 14 described and depicted with respect to FIG. 1 above. The pulser/receiver board 32 receives commands from the I/O communication board 30 and converts the analog signals it receives from the probe interface board 16 to one or more digital signals, which are sent back to the I/O communication Board 30. A plug 34 on the pulser/receiver board 32 provides an interface to the probe interface board 16 as described and depicted in FIG. 1. The axle interface board 26 is configured to connect to the axle PCB 22 as described and depicted with respect to FIG. 1.

Pulser receiver board 32 preferably includes pulser-receiver circuitry operable to provide a pulse signal to the ultrasonic transducers of the ultrasonic transducer array 14 and to receive a signal back from the transducer—i.e., a signal reflected from the rail over which the ultrasonic transducer is positioned. Most preferably, the pulser/receiver board 32 includes pulser-receiver circuitry operable to pulse and receive signals from a plurality of ultrasonic transducers, such as the array of transducers of the ultrasonic transducer array 16 previously described.

In one exemplary embodiment, the RSU unit includes flaw detection circuitry comprising analog-to-digital converter (ADC) circuitry operable to convert the analog signals from the ultrasonic transducers to digital signals, and further comprises digital signal processing (DSP) circuitry in the form of one or more processors, floating point gate arrays (FPGAs), memory, or other such circuitry, operable to perform analysis on the converted digital circuitry and to identify flaws or defects in the rail under examination. In alternative embodiments, the flaw or defect identification may be performed on a remote computer system.

It can be seen that as just described, the multiple boards comprising the flaw detection circuitry are arranged in a small footprint, stacked arrangement that allows all of the functionality to be contained within the RSU tire without requiring the transmission of analog signals which are susceptible to noise and other external interference.

In alternative embodiments, the flaw detection circuitry may be potted, such as in an epoxy, to seal and secure the circuit boards and circuitry within the flaw detection housing 12 to protect against weather and movement or disconnection of any components therein.

Figure 4A:
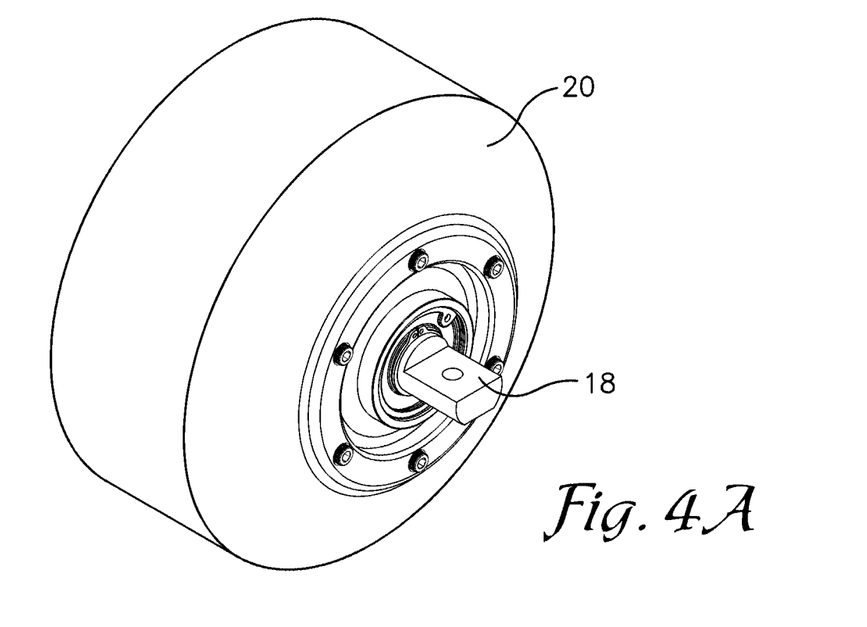
FIG. 4A is perspective view of the assembled RSU of FIG. 1 in accordance with an exemplary embodiment of the present invention.
Figure 4B:
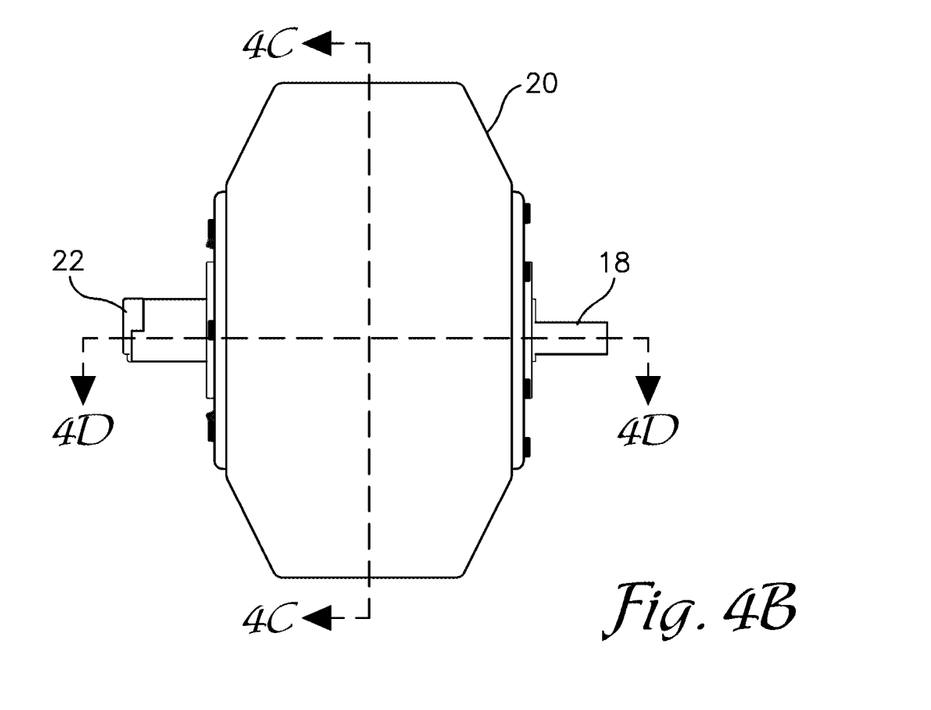
FIG. 4B is a front view of the assembled RSU of FIG. 4A in accordance with an exemplary embodiment of the present invention.
Figure 4C:
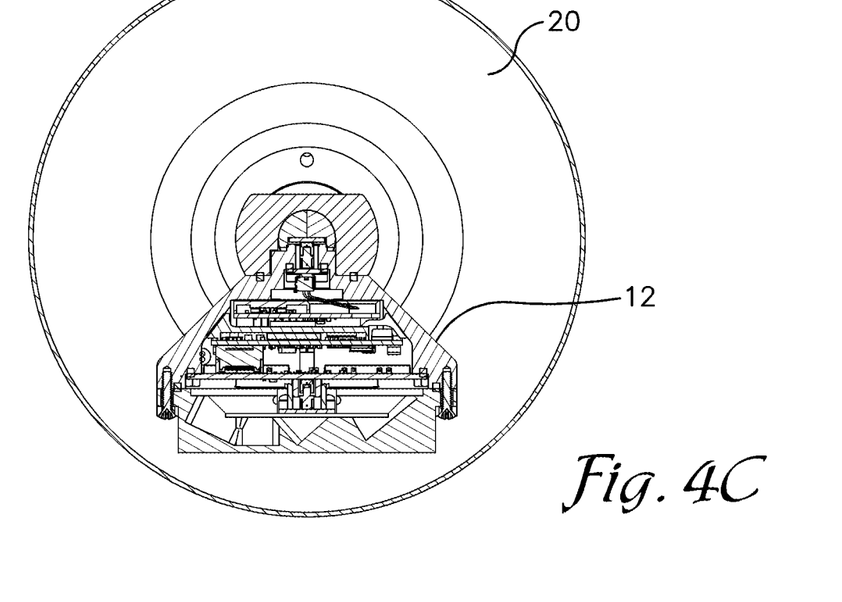
FIG. 4C is a side sectional view of the assembled RSU of FIG. 4B in accordance with an exemplary embodiment of the present invention.
Figure 4D:
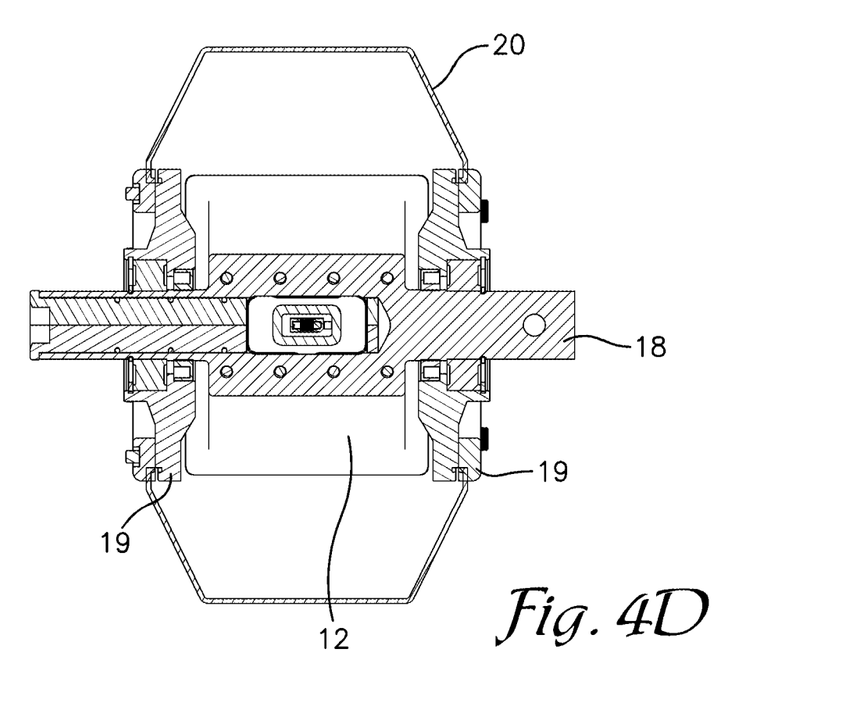
FIG. 4D is a top sectional view of the assembled RSU of FIG. 4B in accordance with an exemplary embodiment of the present invention.

Looking to FIGS. 4A, 4B, 4C, and 4D, additional views of the assembled RSU assembly of FIG. 1 are depicted. As seen in FIGS. 4A and 4B, when assembled, the stacked circuit boards and flaw detection circuitry are completely enclosed within the tire 20 such that the axle 18 allows the RSU to be attached to a transport carriage and/or vehicle. And, as seen in the sectional views of FIGS. 4C and 4D, the flaw detection housing 12 containing the flaw detection circuitry is completely enclosed within the tire 20 mounted to the axle body 18, allowing the wheels 19 and tire 20 to rotate about the flaw detection circuitry, thus allowing the array of ultrasonic transducers therein to gather data from the rail undergoing inspection as the tire rolls along the surface of the rail.

With the structure and arrangement of the RSU set forth, in use, one or more RSU units may be attached to a vehicle carriage assembly or other support structure to transport the RSU unit(s) along a rail to be inspected. For example, the RSU unit(s) may be attached to a carriage having flanged rail wheels for transport along a rail track, with the RSU unit(s) in contact with the surface of the rail so that they roll along that surface collecting data from the transducer array(s) as previously described. The RSU unit may be attached to any transport mechanism or vehicle capable of transporting/rolling the RSU tire along the surface of a rail track, such as a rail car, drone, locomotive, or other vehicle.

Regardless of the transport mechanism, in operation the RSU unit(s) are transported along the rail with the surface of the tire of each unit pressed flat against the rail and the ultrasonic transducer array of each unit providing signals to the respect digital flaw detection circuitry, where the analog signals are converted to digital signals, processed and analyzed, with data as to any identified flaws or defects transmitted via the respective power and communications module to a computer or central processing station. Preferably, the data is transmitted as a digital signal via Ethernet or via any other digital communications link or protocol.

As described above, because the digital flaw detection circuitry with analog-to-digital conversion circuitry is located in close proximity in the inner housing to the analog signals from the transducer array, the electrical pathway prior to conversion to a digital signal is very short, greatly reducing the susceptibility of the signal to noise, interference, or other degradation. Compared to conventional RSU designs which transmit analog signals from the ultrasonic transducers to remote processing circuitry via coaxial cable, the design of the present invention can provide approximately a 20 dB improvement in the signal to noise ratio, greatly improving the quality of the collected data and reducing the need for retesting over conventional systems. In addition, the system of the present invention provides for increased speed of communication and processing of signals to allow local edge processing, allowing for reduced time in processing data and detecting flaws as compared to conventional systems.

It is to be understood that while certain now preferred embodiments of the invention have been illustrated and described, the described embodiments may be arranged in other configurations, and the embodiments herein are not intended to be limiting.

The invention claimed is:

1. A roller search unit having integrated digital circuitry for detecting rail defects, comprising:
   at least one wheel rotatably coupled to an axle;
   a tire having a circumferential surface mounted on the at least one wheel, wherein the circumferential surface of the tire is configured to travel along a surface of a rail undergoing inspection;
   an ultrasonic transducer array attached to a housing positioned within the tire; and
   a compact flaw detection module positioned within the tire, the flaw detection module comprising:
   analog-to-digital conversion circuitry operable to digitize analog signals received from the ultrasonic transducer array;
   digital signal processing circuitry configured to detect flaws in the rail from the digitized signals;
   a plurality of circuit boards having circuitry thereon, the boards arranged in a stacked configuration; and
   wherein the flaw detection module is configured to generate digital output signals representing detected flaws and transmit the digital output signals from within the tire.

2. The roller search unit having integrated digital circuitry for detecting rail defects of claim 1, wherein the analysis on the digital signals performed by the flaw detection circuitry positioned within the tire provides an improvement in the signal to noise ratio of approximately 20 dB over transmitting analog signals to remote digital conversion circuitry.

3. The roller search unit having integrated digital circuitry for detecting rail defects of claim 1, wherein the flaw detection circuitry comprises digital communication circuitry configured to communicate using an Ethernet protocol.

4. The roller search unit having integrated digital circuitry for detecting rail defects of claim 1, wherein the flaw detection circuitry comprises a heating and/or cooling element operable to regulate a temperature of air surrounding the circuitry.

5. The roller search unit having integrated digital circuitry for detecting rail defects of claim 1, wherein the tire is filled with a liquid.

6. The roller search unit having integrated digital circuitry for detecting rail defects of claim 5, wherein the liquid comprises a water and ethylene glycol mixture.

7. A roller search unit having integrated digital circuitry for detecting rail defects, comprising:
   a wheel rotatably coupled to an axle;
   a tire having a circumferential surface configured to travel along a surface of a rail mounted to the wheel; and
   a compact, self-contained flaw detection assembly positioned within the tire, the flaw detection assembly comprising:
   an ultrasonic transducer array;
   analog-to-digital converter circuitry operable to convert analog signals from the ultrasonic transducer array to digital signals;
   digital processing circuitry operable to analyze the digital signals to detect flaws in the rail; and
   communication circuitry configured to transmit flaw data to a remote system via a digital communication protocol.

8. The roller search unit having integrated digital circuitry for detecting rail defects of claim 7, wherein the flaw detection circuitry comprises digital communication circuitry configured to transmit digital data from the roller search unit.

9. The roller search unit having integrated digital circuitry for detecting rail defects of claim 7, wherein the tire is filled with a liquid.

10. The roller search unit having integrated digital circuitry for detecting rail defects of claim 7, further comprising a plurality of circuit boards arranged in a stacked configuration and positioned within a housing attached to an axle within the tire.

11. A roller search unit having integrated digital circuitry for detecting rail defects, comprising:
    a wheel rotatably coupled to an axle;
    a tire having a circumferential surface configured to travel along a surface of a rail mounted to the wheel; and
    a flaw detection module positioned within a housing located entirely within the tire, the flaw detection module comprising:
    a plurality of printed circuit boards arranged in a stacked configuration;
    analog-to-digital conversion circuitry operable to digitize analog signals from an ultrasonic transducer array attached to the housing;
    digital flaw detection logic operable to identify defects in the rail base on the digitized signals; and
    communication circuitry configured to transmit digital defect data directly from the flaw detection module.

12. The roller search unit having integrated digital circuitry for detecting rail defects of claim 11, wherein the flaw detection circuitry is operable to perform analysis on the digital signals to detect flaws in a rail and to transmit digital data from the roller search unit to a central location.

13. The roller search unit having integrated digital circuitry for detecting rail defects of claim 12, wherein the analysis on the digital signals performed by the flaw detection circuitry provides an improvement in the signal to noise ratio of approximately 20 dB compared to transmitting analog signals to remote digital conversion circuitry.

* * * * *